US010079384B2

(12) United States Patent
Kim et al.

(10) Patent No.: US 10,079,384 B2
(45) Date of Patent: Sep. 18, 2018

(54) COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

(71) Applicant: SAMSUNG SDI CO., LTD., Yongin-si, Gyeonggi-do (KR)

(72) Inventors: Ji-Hyun Kim, Yongin-si (KR); Yong-Chan You, Yongin-si (KR); Chang-Wook Kim, Yongin-si (KR); Jun-Seok Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 117 days.

(21) Appl. No.: 13/799,111

(22) Filed: Mar. 13, 2013

(65) Prior Publication Data

US 2014/0072874 A1   Mar. 13, 2014

(30) Foreign Application Priority Data

Sep. 12, 2012   (KR) .......................... 10-2012-0101151

(51) Int. Cl.
*H01M 10/637*   (2014.01)
*H01M 10/63*   (2014.01)
(Continued)

(52) U.S. Cl.
CPC .............. *H01M 4/13* (2013.01); *C01G 51/42* (2013.01); *C01G 53/50* (2013.01); *H01M 4/131* (2013.01);
(Continued)

(58) Field of Classification Search
CPC ...... H01M 4/13; H01M 10/052; H01M 4/131; H01M 4/136; H01M 4/366; H01M 4/485;
(Continued)

(56) References Cited

U.S. PATENT DOCUMENTS 7,135,252 B2   11/2006   Thackeray et al.
7,968,227 B2   6/2011   Cho
(Continued)

FOREIGN PATENT DOCUMENTS

JP   2010-232001 A   10/2010
JP   2011-171150 A   9/2011
(Continued)

OTHER PUBLICATIONS

Machine translation of JP 2012-234772, retrieved from <https://www.j-platpat.inpit.go.jp/web/all/top/BTmTopEnglishPage> on Mar. 25, 2015.*
(Continued)

*Primary Examiner* — Cynthia K Walls
(74) *Attorney, Agent, or Firm* — Robert E. Bushnell, Esq.

(57) ABSTRACT

A composite cathode active material, a cathode including the same, a lithium battery including the cathode, and preparation method thereof are disclosed. The composite cathode active material includes: a core capable of intercalating and deintercalating lithium; and a crystalline coating layer disposed on at least part of a surface of the core, wherein the coating layer include a metal oxide.

19 Claims, 3 Drawing Sheets

(51) Int. Cl.
*H01M 10/625* (2014.01)
*H01M 4/13* (2010.01)
*H01M 4/131* (2010.01)
*H01M 4/136* (2010.01)
*H01M 4/36* (2006.01)
*H01M 10/052* (2010.01)
*C01G 51/00* (2006.01)
*C01G 53/00* (2006.01)
*H01M 4/485* (2010.01)
*H01M 4/505* (2010.01)
*H01M 4/525* (2010.01)
*H01M 4/58* (2010.01)

(52) U.S. Cl.
CPC .......... *H01M 4/136* (2013.01); *H01M 4/366* (2013.01); *H01M 10/052* (2013.01); *C01P 2004/04* (2013.01); *C01P 2004/80* (2013.01); *C01P 2004/84* (2013.01); *C01P 2006/40* (2013.01); *H01M 4/485* (2013.01); *H01M 4/505* (2013.01); *H01M 4/525* (2013.01); *H01M 4/5825* (2013.01); *Y02E 60/122* (2013.01)

(58) Field of Classification Search
CPC .......... H01M 4/582; H01M 4/50; H01M 4/52; C01G 51/42; C01G 53/50; C01P 2004/80; C01P 2004/04; C01P 2004/84; C01P 2006/40; Y02E 60/12
See application file for complete search history.

(56) References Cited

U.S. PATENT DOCUMENTS

| | | | |
|---|---|---|---|
| 2002/0076613 A1* | 6/2002 | Lee | H01M 4/0402 429/231.1 |
| 2003/0138697 A1* | 7/2003 | Leising et al. | 429/231.1 |
| 2004/0228965 A1* | 11/2004 | Lee | H01M 4/131 427/126.3 |
| 2008/0070122 A1 | 3/2008 | Park et al. | |
| 2008/0145760 A1 | 6/2008 | Yoon et al. | |
| 2010/0247986 A1 | 9/2010 | Toyama et al. | |
| 2013/0142944 A1 | 6/2013 | Venkatachalam et al. | |

FOREIGN PATENT DOCUMENTS

| | | | | |
|---|---|---|---|---|
| JP | 2011-187169 A | | 9/2011 | |
| JP | 2012-234772 | * | 11/2012 | ............ H01M 4/525 |
| KR | 10-0571272 B1 | | 4/2006 | |
| KR | 10-2008-0026316 A | | 3/2008 | |
| KR | 10-2008-0037441 A | | 4/2008 | |
| KR | 10-2008-0054708 A | | 6/2008 | |
| KR | 10-2008-0100980 A | | 11/2008 | |
| KR | 10-2011-0084200 A | | 7/2011 | |

OTHER PUBLICATIONS

Guo, Manganese-ion doped layered nanocrystalline li—co—mn—o powders prepared by sol-gel processing, Journal of Metastable and Nanocrystalline Materials, 2002, vol. 15-16, pp. 737-732.*

West (Electrochemical behavior of layered solid solution Li2Mn3—LiMO2 (M=Ni, Mn, Co) li-ion cathodes with and without alumina coatings, Journal of the Electrochemical Society, 158 (8), A883-A889, 2011 (Year: 2011).*

Korean Office Action dated Dec. 27, 2017 in the corresponding Korean Patent Application No. 10-2012-0101151 as its priority application, together with Request for Entry of the Accompanying Office Action attached herewith.

* cited by examiner

FIG. 4

Mixing precursors of a lithium transition metal oxide with a solvent to prepare a slurry Grinding and drying the slurry to obtain spherical particles Further mixing the spherical particles with precursors of the lithium transition metal oxide to prepare a mixture Calcining the mixture under atmospheric conditions

COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL

CLAIM OF PRIORITY

This application makes reference to, incorporates the same herein, and claims all benefits accruing under 35 U.S.C. § 119 from and application for COMPOSITE CATHODE ACTIVE MATERIAL, CATHODE AND LITHIUM BATTERY INCLUDING THE COMPOSITE CATHODE ACTIVE MATERIAL, AND METHOD OF PREPARING THE COMPOSITE CATHODE ACTIVE MATERIAL earlier filed in the Korean Intellectual Property Office on 12 Sep. 2012 and there duly assigned Serial No. 10-2012-0101151.

BACKGROUND OF THE INVENTION

Field of the Invention

One or more embodiments of the present invention relate to a composite cathode active material, and a cathode and a lithium battery each including the composite cathode active material, and a method of preparing the composite cathode active material.

Description of the Related Art

In general, transition metal compounds such as $LiNiO_2$, $LiCoO_2$, $LiMn_2O_4$, $LiFePO_4$, $LiNi_xCo_{1-x}O_2$ ($0 \leq x \leq 1$), and $LiNi_{1-x-y}Co_xMn_yO_2$ ($0 \leq x \leq 0.5$, $0 \leq y \leq 0.5$), and lithium oxides thereof are currently used as cathode active materials for lithium batteries. Batteries made from these cathode active materials have limited electrical capacities, and thus, novel cathode active materials having various structures have been suggested. In particular, along with the trend for high-capacity batteries, composite oxides are suggested as an alternative to transition metal-based compounds.

An example of the composite oxides having a layered structure is $xLi_2MO_3$-$(1-x)LiMeO_2$ (where $0<x<1$, and M and Me are transition metals). Although this composite oxide has a high theoretical electrical capacity, it may practically have a low electrical conductivity since Li2MO3 is a non-conductor, and thus leads to reduced lifetime characteristics' and high-rate characteristics.

Therefore, there still is a need in the art for a cathode active material having high capacity and improved lifetime and high-rate characteristics.

SUMMARY OF THE INVENTION

One or more embodiments of the present invention include a composite cathode active material having a novel structure.

One or more embodiments of the present invention include a cathode including the cathode active material.

One or more embodiments of the present invention include a lithium battery including the cathode.

Additional aspects will be set forth in part in the description which follows and, in part, will be apparent from the description, or may be learned by practice of the presented embodiments.

According to one or more embodiments of the present invention, a composite cathode active material includes: a core capable of intercalating and deintercalating lithium; and a crystalline coating layer disposed on at least part of a surface of the core, wherein the coating layer includes a metal oxide.

According to one or more embodiments of the present invention, a cathode includes the above-described composite cathode active material.

According to one or more embodiments of the present invention, a lithium battery includes the above-described cathode.

According to one or more embodiments of the present invention, a method of preparing a composite cathode active material includes: mixing a part of precursors of a lithium transition metal oxide with a solvent to prepare a slurry; grinding and drying the slurry to obtain spherical particles; mixing the spherical particles with the remaining precursors of the lithium transition metal oxide to prepare a mixture; and calcining the mixture in an atmospheric condition to form a crystalline coating layer on surfaces of the spherical particles.

BRIEF DESCRIPTION OF THE DRAWINGS

These and/or other aspects will become apparent and more readily appreciated from the following description of the embodiments, taken in conjunction with the accompanying drawings of which:

FIG. 4 is a flow chart showing a general method of preparation of a composite cathode active material of the present invention.

DETAILED DESCRIPTION OF THE INVENTION

Figure 1:
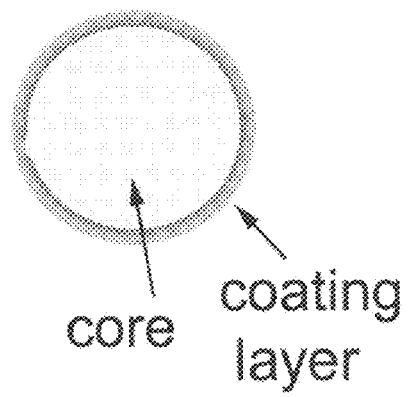
FIG. 1 is a schematic cross-sectional view of a composite cathode active material according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, one or more embodiments of a composite cathode active material, a cathode including the composite cathode active material, a lithium battery including the cathode and preparation method thereof will be described in greater detail.

One or more embodiments of the present invention include a composite cathode active material that includes: a core capable of intercalating and deintercalating lithium; and a crystalline coating layer disposed on at least part of a surface of the core, wherein the coating layer comprises a metal oxide.

That is, the composite cathode active material may include a coating layer on at least part or entire surface of the core, the coating layer including a crystalline phase metal oxide.

The crystalline phase metal oxide in the coating layer may have improved electrical conductivity as compared with amorphous metal oxides, may effectively exhibit inherent physical characteristics of a metal oxide. Since the core is coated with the coating layer including the crystalline metal oxide having a high electrical conductivity, the composite cathode active material may have improved surface electrical conductivity, which may improve lifetime characteristics and high-rate characteristics of a lithium battery when used in the lithium battery.

For example, the composite cathode active material may have a structure as illustrated in FIG. 1: That is, the coating layer may have a structure completely coating the core. A metal of the metal oxide may include both an alkali metal and a transition metal.

In the composite cathode active material, the coating layer may include a first transition metal oxide. For example, the coating layer may include at least one first transition metal oxide selected from the group consisting of $LiCoO_2$, $LiNiO_2$, $LiMnO_2$, $LiMn_2O_4$, and $LiCoPO_4$.

The core of the composite cathode active material may include a second lithium transition metal oxide. The second transition metal oxide may be a compound different from the first transition metal oxide.

The core may include an overlithiated lithium transition metal oxide having a layered structure.

In some embodiments, the core may include a compound represented by Formula 1 below:

$$pLi_2MO_3\text{-}(1\text{-}p)LiMeO_2 \qquad <\text{Formula 1}>$$

In Formula 1 above, $0<p<1$; M is at least one metal selected from the group consisting of magnesium (Mg), calcium (Ca), strontium (Sr), barium (Ba), titanium (Ti), zirconium (Zr), neodymium (Nb), molybdenum (Mo), tungsten (W), zinc (Zn), aluminum (Al), silicon (Si), nickel (Ni), manganese (Mn), chromium (Cr), iron (Fe), magnesium (Mg), strontium (Sr), vanadium (V), and a rare earth element; and Me is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B).

In some other embodiments, the core may include a compound represented by Formula 2 below:

$$pLi_2MnO_3\text{-}(1\text{-}p)LiNi_aCo_bMn_cO_2 \qquad <\text{Formula 2}>$$

In Formula 2 above, $0<p<1$, $0<a<1$, $0<b<1$, $0<c<1$, and $a+b+c=1$. For example, in Formula 2, $0<[(1\text{-}p)\times a]/[(1\text{-}p)\times c+p]\leq 0.14$. For example, in Formula 2, a ratio of Ni/Mn may be less than about 0.14. For example, in Formula 2, $0.5<p<1$.

In some other embodiments, the core may include a compound represented by Formula 3 below:

$$xLi_2MO_3\text{-}yLiMeO_2\text{-}zLi_{1+d}M'_{2\text{-}d}O_4 \qquad <\text{Formula 3}>$$

In Formula 3 above, $x+y+z=1$, $0<x<1$, $0<y<1$, and $0<z<1$; $0\leq d\leq 0.33$;

M is at least one metal selected from the group consisting of magnesium (Mg), calcium (Ca), strontium (Sr), barium (Ba), titanium (Ti), zirconium (Zr), neodymium (Nb), molybdenum (Mo), tungsten (W), zinc (Zn), aluminum (Al), silicon (Si), nickel (Ni), manganese (Mn), chromium (Cr), iron (Fe), magnesium (Mg), strontium (Sr), vanadium (V), and a rare earth element; Me is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); and M' is at least one metal selected from the group consisting of manganese (Mn), vanadium (V), chromium (Cr), iron (Fe), cobalt (Co), nickel (Ni), aluminum (Al), and boron (B).

In some other embodiments, the cathode may further include a lithium composite oxide represented by Formula 4 below:

$$Li[Li_xMe_y]O_{2+d} \qquad <\text{Formula 4}>$$

In Formula 4, $x+y=1$ and $0<x<1$; $0\leq d\leq 0.1$; Me is at least one metal selected from the group consisting of manganese (Mn), vanadium (V), chromium (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt).

In some other embodiments, the core may include a compound represented by Formula 5 below:

$$Li[Li_xNi_aCo_bMn_c]O_{2+d} \qquad <\text{Formula 5}>$$

In Formula 5 above, $x+a+b+c=1$; $0<x<1$, $0<a<1$, $0<b<1$, $0<c<1$; and $0\leq d\leq 0.1$.

In some other embodiments, the core may include at least one selected from the group consisting of Compounds 6 to 10 below:

$$Li_xCo_{1\text{-}y}M_yO_{2\text{-}\alpha}X_\alpha \qquad <\text{Formula 6}>$$

$$Li_xCo_{1\text{-}y\text{-}z}Ni_yM_zO_{2\text{-}\alpha}X_\alpha \qquad <\text{Formula 7}>$$

$$Li_xMn_{2\text{-}y}M_yO_{4\text{-}\alpha}X_\alpha \qquad <\text{Formula 8}>$$

$$Li_xCo_{2\text{-}y}M_yO_{4\text{-}\alpha}X_\alpha \qquad <\text{Formula 9}>$$

$$Li_xMe_yM_zPO_{4\text{-}\alpha}X_\alpha \qquad <\text{Formula 10}>$$

In Formulae 6 to 10 above, $0.90\leq x\leq 1.1$, $0\leq y\leq 0.9$, $0\leq z\leq 0.5$, and $1\text{-}y\text{-}z>0$; $0\leq \alpha\leq 2$; Me is at least one metal selected from the group consisting of manganese (Mn), vanadium (V), chromium (Cr), iron (Fe), cobalt (Co), nickel (Ni), aluminum (Al), and boron (B); M is at least one metal selected from the group consisting of magnesium (Mg), calcium (Ca), strontium (Sr), barium (Ba), titanium (Ti), zirconium (Zr), neodymium (Nb), molybdenum (Mo), tungsten (W), zinc (Zn), aluminum (Al), silicon (Si), nickel (Ni), manganese (Mn), chromium (Cr), iron (Fe), magnesium (Mg), strontium (Sr), vanadium (V), and a rare earth element; and X is an element selected from the group consisting of oxygen (O), fluorine (F), sulfur (S), and phosphate (P).

In some other embodiments, the core may include a compound represented by Formula 11 below:

$$Li_xM_yM'_zPO_{4\text{-}d}X_d \qquad <\text{Formula 11}>$$

In Formula 11 above, $0.9\leq x\leq 1.1$, $0<y\leq 1$, $0\leq z\leq 1$, $1.9\leq x+y+z\leq 2.1$, and $0\leq d\leq 0.2$; M is at least one selected from the group consisting of iron (Fe), manganese (Mn), nickel (Ni), and cobalt (Co); M' is at least one selected from the group consisting of magnesium (Mg), calcium (Ca), copper (Cu), neodymium (Nd), strontium (Sr), barium (Ba), titanium (Ti), zirconium (Zr), niobium (Nb), molybdenum (Mo), tungsten (W), zinc (Zn), aluminum (Al), and silicon (Si); and X is at least one selected from the group consisting of sulfur (S) and fluorine (F).

For example, the core may include at least one selected from the group consisting of $LiFePO_4$, $LiFe_{1\text{-}a}Mn_aPO_4$ ($0<a<1$), and $LiMnPO_4$.

In the composite cathode active material, an amount of the metal oxide in the coating layer may be from about 0.01 wt % to about 10 wt % based on a total weight of the composite cathode active material. When the amount of the metal oxide is within these ranges, more improved electric conductivity and lifetime characteristics may be attained. When the amount of the metal oxide is too high, the discharge capacity may be reduced. When the amount of the metal oxide is too low, the electrical conductivity may be lowered.

The coating layer of the composite cathode active material may have a thickness of about 1 Å to about 1 μm. For example, the coating layer may have a thickness of from about 1 nm to about 1 μm, and in some other embodiments, may have a thickness of from about 1 nm to about 100 nm, and in some other embodiments, may have a thickness of about 1 nm to about 30 nm, and in some embodiments, may have a thickness of about 5 nm to about 15 nm. When the thickness of the coating layer is within these ranges a lithium battery with improved characteristics may be obtained using the composite cathode active material.

The core of the composite cathode active material may have an average particle diameter of from about 10 nm to about 500 μm, and in some embodiments, may have an average particle diameter of from about 10 nm to about 100 μm, and in some other embodiments, may have an average particle diameter of from about 10 nm to about 50 μm, and in some other embodiments, may have an average particle diameter of from about 1 μm to about 30 μm. When the average particle size diameter is within these ranges, a lithium battery with improved characteristics may be obtained using the composite cathode active material.

The coating layer of the composite cathode active material of one of the Formulas may have a higher electrical conductivity than the core. Since the first lithium metal oxide of the coating layer has a higher electrical conductivity as compared with the second transition metal oxide of the core, the composite cathode active material may have improved surface electrical conductivity and thus improved charging and discharging characteristics.

One or more embodiments of the present invention include a cathode including the composite cathode active material.

The cathode may be manufactured as follows. First, the above-described composite cathode active material, a conducting agent, a binder, and a solvent are mixed to prepare a cathode active material composition. The cathode active material composition is coated directly on an aluminum current collector and dried to form a cathode active film on a cathode plate. Alternatively, the cathode active material composition may be cast on a separate support to form a cathode active material film, which is then separated from the support and laminated on an aluminum current collector to prepare a cathode plate with the cathode active material film.

Non-limiting examples of the conducting agent include carbon black, graphite particulates, natural graphite, artificial graphite, acetylene black, ketjen black, carbon fibers, metallic materials, such as copper, nickel, aluminum, silver, and the like, in powder, fiber, or tube form, and a conductive polymer such as polyphenylene derivatives. Any conducting agent available in the art may be used.

Non-limiting examples of the binder include a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Non-limiting examples of the solvent include N-methyl-pyrrolidone (NMP), acetone, and water. Any material available for these purposes in the art may be used.

Alternatively, a plasticizer may be further added into the cathode active material composition to form a cathode plate with pores.

The amounts of the composite cathode active material, the conducting agent, the binder, and the solvent are those levels that are generally used in the manufacture of a lithium battery. At least one of the conducting agent, the binder and the solvent may not be used according to the use and the structure of the lithium battery.

In another embodiment, the cathode may further include a conventional cathode active material, in addition to the composite cathode active material.

The conventional cathode active material may be any one available in the art, for example, may be a lithium-containing metal oxide. For example, at least one of lithium composite oxides with metals selected from among cobalt, manganese, nickel and a combination thereto may be used. Non-limiting examples of lithium metal oxides are compounds represented by the following formulas: $Li_aA_{1-b}B_bD_2$ (where $0.90 \leq a \leq 1$, and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$, and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 \leq \alpha \leq 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$, and $0.001 \leq b \leq 0.1$); $Li_aCoG_bO_2$ (where $0.90 \leq a \leq 1$, and $0.001 \leq b \leq 0.1$); $Li_aMnG_bO_2$ (where $0.90 \leq a \leq 1$, and $0.001 \leq b \leq 0.1$); $Li_aMn_2G_bO_4$ (where $0.90 \leq a \leq 1$, and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae above, A is selected from the group consisting of nickel (Ni), cobalt (Co), manganese (Mn), and combinations thereof; B is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; F is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; I is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof.

Non-limiting examples of the cathode active material are $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ (0≤x≤0.5, 0≤y≤0.5), and $FePO_4$.

The compounds listed above as cathode active materials may have a surface coating layer (hereinafter, "coating layer"). Alternatively, a mixture of a compound without a coating layer and a compound having a coating layer, the compounds being selected from the compounds listed above, may be used. The coating layer may include at least one compound of a coating element selected from the group consisting of oxide, hydroxide, oxyhydroxide, oxycarbonate, and hydroxycarbonate of the coating element. These compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or mixtures thereof. The coating layer may be formed using any method that does not adversely affect the physical properties of the cathode active material when a compound of the coating element is used. For example, the coating layer may be formed using a spray coating method, a dipping method, or the like. This is known to those of skill in the art, and thus a detailed description thereof will be omitted.

One or more embodiments of the present invention include a lithium battery including the cathode containing the composite cathode active material. The lithium battery may be manufactured in the following manner.

First, a cathode is prepared according to the above-described cathode formation method.

Next, an anode may be manufactured as follows. The anode may be manufactured in the same manner as the cathode, except for using an anode active material, instead of the composite cathode active material. A conducting agent, a binder, and a solvent used to prepare an anode active material composition may be the same as those used in the cathode active material composition.

For example, an anode active material, a conducting agent, a binder, and a solvent are mixed to prepare an anode active material composition, which is then coated directly on a copper current collector, thereby manufacturing an anode plate. Alternatively, the anode active material composition may be cast on a separate support, and then an anode active material film separated from the support may be laminated on a copper current collector to prepare an anode plate.

The anode active material may be any anode active material for a lithium battery available in the art. For example, the anode active material may include at least one selected from the group consisting of lithium metal, a metal that is alloyable with lithium, a transition metal oxide, a non-transition metal oxide, and a carbonaceous material.

Examples of the metal alloyable with lithium include Si, Sn, Al, Ge, Pb, Bi, Sb, a Si—Y alloy (where Y is an alkali metal, an alkali earth metal, a Group XIII element, a Group XIV element, a transition metal, a rare earth element, or a combination thereof except for Si), and a Sn—Y alloy (where Y is an alkali metal, an alkali earth metal, a Group XIII element, a Group XIV element, a transition metal, a rare earth element, or a combination thereof except for Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

Non-limiting examples of the transition metal oxide are a lithium titanium oxide, a vanadium oxide, and a lithium vanadium oxide.

Non-limiting examples of the non-transition metal oxide include $SnO_2$ and $SiO_x$ (0<x<2).

Examples of the carbonaceous material are crystalline carbon, amorphous carbon, and mixtures thereof. Examples of the crystalline carbon are graphite, such as natural graphite or artificial graphite that are in amorphous, plate, flake, spherical or fibrous form. Examples of the amorphous carbon include soft carbon (carbon sintered at low temperatures), hard carbon, meso-phase pitch carbides, sintered corks, and the like.

The amounts of the cathode electrode active material, the conducting agent, the binder, and the solvent are those levels that are generally used in the manufacture of a lithium battery.

Next, a separator to be disposed between the cathode and the anode is prepared. The separator for the lithium battery may be any separator that is commonly used in lithium batteries. The separator may have low resistance to migration of ions in an electrolyte and have an excellent electrolyte-retaining ability. Examples of the separator include glass fiber, polyester, Teflon, polyethylene, polypropylene, polytetrafluoroethylene (PTFE), and combinations thereof, each of which may be a non-woven or woven fabric. For example, a rollable separator including polyethylene or polypropylene may be used for a lithium ion battery. A separator with a good organic electrolyte solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin include a vinylidenefluoride/hexafluoropropylene copolymer, polyvinylidene fluoride (PVDF), polyacrylonitrile, polymethylmethacrylate and mixtures thereof.

Next, an electrolyte is prepared.

For example, the electrolyte may be an organic electrolyte solution. Alternately, the electrolyte may be in a solid phase. Non-limiting examples of the electrolyte include lithium oxide and lithium oxynitride. Any material available as a solid electrolyte in the art may be used. The solid electrolyte may be formed on the anode by, for example, sputtering.

In some embodiments, an organic electrolyte solution may be prepared as follows. The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. Non-limiting examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, and mixtures thereof.

Figure 3:
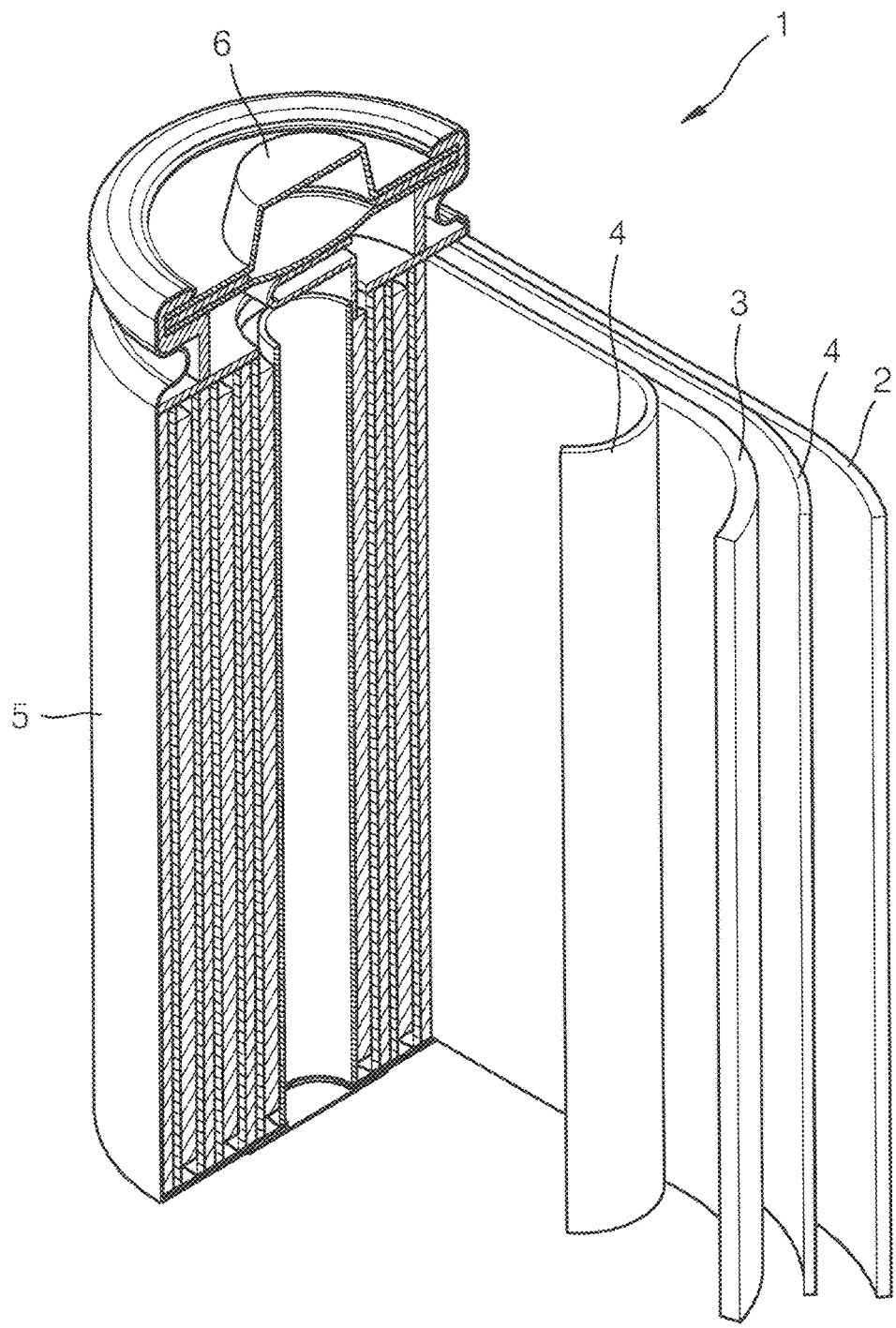
FIG. 3 is a schematic view of a lithium battery according to an embodiment of the present invention.

Referring to FIG. 3, a lithium battery 1 according to an embodiment of the present invention includes a cathode 3, an anode 2, and a separator 4. The cathode 3, the anode 2 and the separator 4 are wound or folded, and then sealed in a battery case 5. Then, the battery case 5 is filled with an organic electrolyte solution and sealed with a cap assembly 6, thereby completing the manufacture of the lithium battery 1. The battery case 5 may be a cylindrical type, a rectangular type, or a thin-film type. For example, the lithium battery may be a thin-film type battery. The lithium battery may be a lithium ion battery.

The separator may be interposed between the cathode and the anode to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high output, for example, in a laptop computer, a smart phone, electric vehicle, and the like.

The lithium battery may have improved lifetime and high rate characteristics, and thus may be applicable in an electric vehicle (EV), for example, in a hybrid vehicle such as plug-in hybrid electric vehicle (PHEV). The lithium battery may be applicable to the high-power storage field, for example, in an electric bicycle, a power tool, and the like.

One or more embodiments of the present invention include a method of preparing the composite cathode active material described above, the method including: mixing precursors of a lithium transition metal oxide with a solvent to prepare a slurry; grinding and drying the slurry to obtain spherical particles; further mixing the spherical particles with precursor of the lithium transition metal oxide to prepare a mixture; and calcining the mixture under atmospheric conditions to form a crystalline coating layer on surfaces of the spherical particles.

The term "precursor" as used herein generally means a chemical compound that through a chemical reaction produces another compound. Precursors of the metal oxides described herein generally form lithium transition metal oxides when heated. Examples include lithium carbonate ($Li_2CO_3$), nickel oxide (NiO), cobalt oxide ($Co_3O_4$), and manganese oxide ($MnO_2$) but are not limited thereto.

The precursor of the lithium transition metal oxide may include a lithium precursor and a transition metal precursor. In some embodiments, a portion of the precursor of the lithium transition metal oxide may be mixed with a solvent to prepare a precursor slurry. The precursor slurry may be ground using, for example, a beads mill, and then dried to obtain spherical particles.

The drying may be performed using a method selected from the group consisting of spray drying, spin drying, and rotary drying, but is not limited thereto. Any drying method known in the art to prepare spherical particles may be used.

The spherical particles may then be mixed with the remaining precursor powder of the lithium transition metal oxide to obtain a mixture, which may be then calcinated under atmospheric conditions to form the crystalline coating layer on at least part of or on the entire surface of the core in the spherical particles. The remaining precursor powder may be used in excess of several to tens of wt % relative to stoichiometric ratio for preparing a target lithium transition metal oxide Unlike conventional methods of forming a coating layer after completion of the synthesis of cathode active particles, in the preparation method according to the embodiments of the present invention, after preparing primary precursor particles and mixing them with the remaining precursor particles, the lithium transition metal oxide and the coating layer forming the core together are simultaneously formed through calcination. In conventional methods in which the coating layer is formed on the synthesized active material particles, calcination temperature for the coating layer formation is as low as about 700° C. or less. However, according to embodiments of the present invention, the coating layer is formed at a high temperature of about 800° C. or higher at which calcination is performed to synthesize the active material, so that the coating layer may have higher crystallinity.

The calcining may be performed at a temperature of from about 800° C. to about 900° C. for about 5 hours to about 20 hours. When the calcination temperature is too low, metal oxide of the core may not be synthesized. When the calcination temperature is too high, particle diameters of the primary particles may become too large, so that capacity and high-rate characteristics of the battery may be reduced. When the calcination time is too short, metal oxide of the core may not be synthesized. When the calcination time is too long, particle diameters of the primary particles may become too large, so that capacity and high-rate characteristics of the battery may be reduced.

Some embodiments include preparing a composite cathode active material with a crystalline lithium cobalt oxide coating layer on a core including overlithiated lithium-nickel-cobalt-manganese oxide. An overlithiated metal oxide is a metal oxide having more than 1 lithium ratio with respect to other metal of the metal oxide. For example, at least a part of transition metal is substituted with lithium in the overlithiated transition metal oxide as in formula 4. In formula 4, an amount of the overlithiated lithium is 0<x<1. An overlithiated oxide can be prepared by after separating predetermined amounts of the lithium precursor and the cobalt precursor from a lithium precursor, a nickel precursor, a cobalt precursor, and a manganese precursor, the remaining precursors may then be first mixed with a solvent to prepare a slurry, which may then be ground and dried using spray drying to obtain spherical particles of the precursors. Next, the spherical particles and the separated portions of the lithium precursor and the cobalt precursor may be mixed together in a dry condition, and calcinated under atmospheric conditions. The separated lithium precursor powder and cobalt precursor powder may be mixed in a 1:1 mole ratio, and may be used in excess relative to a stoichiometric ratio for preparing the composite cathode active material.

Here, one or more embodiments of the present invention will be described in detail with reference to the following examples. However, these examples are not intended to limit the scope of the one or more embodiments of the present invention.

(Preparation of Composite Cathode Active Material)

Composite Cathode Active Material with $LiCoO_2$ Coating Layer on $0.45Li(Ni_{0.2}Co_{0.5}Mn_{0.3}O_2)$-$0.55(Li_2MnO_3)$ Core.

As starting materials, lithium carbonate ($Li_2CO_3$), nickel oxide (NiO), cobalt oxide ($Co_3O_4$), and manganese oxide ($MnO_2$) were prepared in appropriate amounts with a mole ratio of Li, Ni, Co, and Mn for preparing a predetermined amount of a composite cathode active material with a $0.45Li(Ni_{0.2}Co_{0.5}Mn_{0.3}O_2)$-$0.55(Li_2MnO_3)$ core and a $LiCoO_2$ coating layer.

After separating predetermined amounts of the lithium carbonate and cobalt oxide required for preparing the $LiCoO_2$ coating layer in about 2 wt % of a total weight of the composite cathode active material from the starting materials, the remaining starting materials were mixed with deionized water as a solvent to prepare an active material slurry having a 20 wt % of solid content. After grinding and mixing the active material slurry together using a beads mill for about 180 minutes, the ground slurry was spray-dried to obtain spherical precursor particle powder, which was then mixed with the separated lithium carbonate and cobalt oxide in a dry manner, and calcinated in an oxygen atmosphere in a furnace at about 900° C. for about 10 hours, thereby preparing a composite cathode active material.

The lithium carbonate and cobalt oxide mixed with the spherical particle powder were in a mole ratio of 1:1, and were added in excess of 2 wt % relative to a stoichiometric ratio for preparing the $LiCoO_2$ coating layer.

Example 2: Composite Cathode Active Material with $LiCoO_2$ Coating Layer on $0.5LiNi_{0.2}Co_{0.5}Mn_{0.3}O_2$-$0.5Li_2MnO_3$ Core A composite cathode active material was prepared in the same manner as in Example 1, except that a mole ratio of Li, Ni, Co and Mn was adjusted to obtain a core including a $0.4LiNi_{0.2}Co_{0.5}Mn_{0.3}O_2$-$0.5Li_2MnO_3$ active material and a $LiCoO_2$ coating layer.

Example 3: Composite Cathode Active Material with $LiCoO_2$ Coating Layer on $LiNi_{0.2}Co_{0.5}Mn_{0.3}O_2$ Core A composite cathode active material was prepared in the same manner as in Example 1, except that a mole ratio of Li, Ni, Co and Mn was adjusted to obtain a core including a $LiNi_{0.2}Co_{0.5}Mn_{0.3}O_2$ active material and a $LiCoO_2$ coating layer.

Example 4: Composite Cathode Active Material with $LiCoO_2$ Coating Layer on $LiNi_{0.6}Co_{0.2}Mn_{0.2}O_2$ Core A composite cathode active material was prepared in the same manner as in Example 1, except that a mole ratio of Li, Ni, Co and Mn was adjusted to obtain a core including a $LiNi_{0.6}Co_{0.2}Mn_{0.2}O_2$ active material and a $LiCoO_2$ coating layer.

Composite Cathode Active Material with No $LiCoO_2$ Coating Layer on $0.45Li(Ni_{0.2}Co_{0.5}Mn_{0.3}O_2)$-$0.55(Li_2MnO_3)$ Core.

As starting materials, lithium carbonate ($Li_2CO_3$), nickel oxide (NiO), cobalt oxide ($Co_3O_4$), and manganese oxide ($MnO_2$) were prepared in appropriate amounts with a mole ratio of Li, Ni, Co, and Mn for preparing a predetermined amount of a composite cathode active material $0.45Li(Ni_{0.2}Co_{0.5}Mn_{0.3}O_2)$-$0.55(Li_2MnO_3)$.

The starting materials were mixed with deionized water as a solvent to prepare an active material slurry having a 20 wt % solid content. After grinding and mixing the active material slurry together using a beads mill for about 180 minutes, the ground slurry was spray-dried to obtain a spherical precursor particle powder, which was then calcinated in an oxygen atmosphere in a furnace at about 900° C. for about 10 hours, thereby preparing a composite cathode active material.

Comparative Example 2

$LCoO_2$ powder and $0.45Li(Ni_{0.2}Co_{0.5}Mn_{0.3}O_2)$-$0.55(Li_2MnO_3)$ powder prepared in Comparative Example 1 were simply mixed together in a weight ratio of about 2:98 to prepare a composite cathode active material.

(Manufacture of Cathode and Lithium Battery)

Example 5

The cathode active material powder of Example 1 and a carbonaceous conducting agent (Super-P; Timcal Ltd.) were uniformly mixed in a weight ratio of 90:5, and then a polyvinylidene fluoride (PVDF) binder solution was added thereto to prepare a slurry containing the cathode active material, the carbonaceous conducting agent, and the binder in a weight ratio of 90:5:5.

The slurry was coated on a 15 μm-thick aluminum foil and then dried to form a cathode plate. Then, the cathode plate was further dried in a vacuum to manufacture a coin cell (CR2016).

In manufacturing the cell, metal lithium as a counter electrode, a polypropylene separator (Celgard 3501), and an electrolyte solution of 1.3M $LiPF_6$ dissolved in a mixed solvent of ethylenecarbonate (EC) and diethylcarbonate (DEC) in a 3:7 volume ratio were used.

Examples 6-8

Lithium batteries were manufactured in the same manner as in Example 1, except that the composite cathode active materials synthesized in Examples 2 to 4 were respectively used.

Comparative Examples 3-4

Lithium batteries were manufactured in the same manner as in Example 1, except that the composite cathode active materials prepared in Comparative Examples 1-2 were respectively used.

Evaluation Example 1: TEM Analysis

TEM analysis was performed on the composite cathode active material powder prepared in Example 1. The results are shown in FIG. 2.

Figure 2:
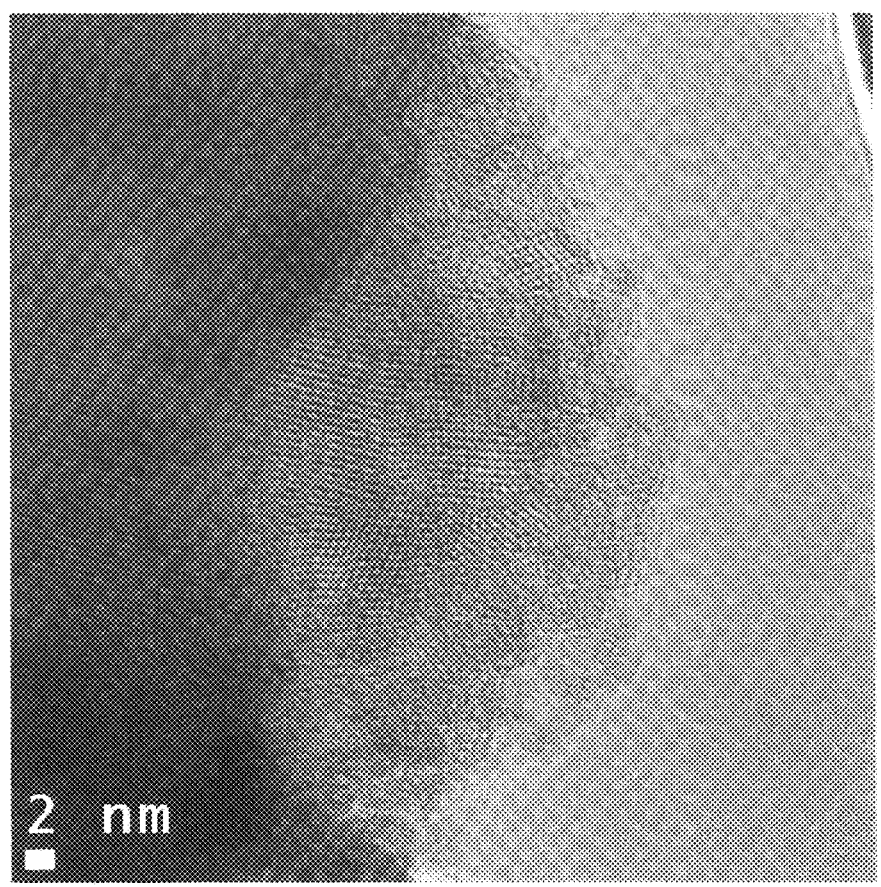
FIG. 2 is a transmission electron microscopic (TEM) image of a composite cathode active material prepared in Example 1.

Referring to FIG. 2, the composite cathode active material powder of Example 1 was found to have a coating layer on the core, the coating layer having a crystalline lattice. This indicates that $LiCoO_2$ crystalline coating layer was formed on the $0.45LiNi_{0.2}Co_{0.5}Mn_{0.30}O_2$-$_{0.55}Li_2MnO_3$ core. The thickness of the coating layer was about 10 nm.

Evaluation Example 2: Measurement of Specific Conductivity

Specific conductivities of the composite cathode active material powders of Examples 1-4 and Comparative Examples 1-2 were measured to evaluate surface electrical conductivities of these composite cathode active materials. The results are shown in Table 1 below.

TABLE 1

|  | Specific conductivity [S/cm] |
| --- | --- |
| Example 1 | $9.3 \times 10^{-5}$ |
| Example 2 | $8.7 \times 10^{-5}$ |
| Example 3 | $4 \times 10^{-4}$ |
| Example 4 | $7 \times 10^{-4}$ |
| Comparative Example 1 | $1.4 \times 10^{-7}$ |
| Comparative Example 2 | $3.2 \times 10^{-6}$ |

Referring to Table 1, the composite cathode active materials of Examples 1-4 are found to have remarkably improved specific conductivities as compared with the cathode active materials of Comparative Examples 1-2 having no coating layer.

Evaluation Example 4: Evaluation of Lifetime Characteristics

The coin cells manufactured in Examples 5-8 and Comparative Examples 3-5 were each charged with a constant current of 0.1 C rate at 25° C. until a cell voltage reached about 4.7V with respect to the Li metal. Afterward, the cell was discharged at a constant current of 0.1 C until the voltage reached 2.5V with respect to the Li metal (Formation process).

Subsequently, each of the lithium batteries after the formation process was charged with a constant current of 1.0 C rate at about 25° C. until the voltage of the cell reached about 4.6V (with respect to Li). Subsequently, the cell was charged at a constant voltage of about 4.6V until the current of the cell decreased to 0.05 C, followed by discharging with a constant current of about 1.0 C until the voltage reached about 2.5V (with respect to Li). This cycle of charging and discharging was repeated 30 times.

The results of the charging/discharging test are shown in part in Table 2 below. The charge/discharge efficiency and capacity retention rate are represented by Equations 1 and 2, respectively below:

Charge/discharge efficiency (%)=Discharge capacity/ Charge capacity×100    Equation 1

Capacity retention rate (%)=Discharge capacity at $30^{th}$ cycle/Discharge capacity at $1^{st}$ cycle×100    Equation 2

TABLE 2

|  | Charge/discharge efficiency at $30^{th}$ cycle [%] | Capacity retention rate at $30^{th}$ cycle [%] | Discharge capacity at $30^{th}$ cycle [mAh/g] |
| --- | --- | --- | --- |
| Example 5 | 98 | 80 | 182 |
| Example 6 | 96 | 79 | 175 |
| Comparative Example 3 | 94 | 72 | 164 |

TABLE 2-continued

|  | Charge/discharge efficiency at $30^{th}$ cycle [%] | Capacity retention rate at $30^{th}$ cycle [%] | Discharge capacity at $30^{th}$ cycle [mAh/g] |
| --- | --- | --- | --- |
| Comparative Example 4 | 95 | 75 | 169 |

Referring to Table 2, the lithium batteries of Examples 5-6 are found to have improved initial efficiencies, lifetime characteristics, and discharge capacities at high rates, as compared with those of Comparative Examples 3-4.

Evaluation Example 5: Evaluation of High-Rate Charge-Discharge Characteristics

The coin cells manufactured in Examples 5-8 and Comparative Examples 3-4 were each charged with a constant current of 0.5 C per 1 g of the cathode active material (7.5 mA/g) at room temperature (25° C.) until a cell voltage reached about 4.6V with respect to the Li metal, and then charged at a constant voltage until the current reached 0.05 C. Subsequently, discharging at constant current was performed with an increasing current density until the voltage reached 2.5V (with respect to Li). While the charge-discharge cycle was repeated, the current density for discharging was sequentially increased. The current density for each discharge was 0.05 C, 0.1 C, 0.2 C, 0.5 C, 1 C, 2 C, and 5 C rate.

The results of the high-rate charging-discharging test are shown in part in Table 3 below.

TABLE 3

| C-rate | Comparative Example 3 Initial discharge capacity (mAh/g) | Comparative Example 4 Initial discharge capacity (mAh/g) | Example 5 Initial discharge capacity (mAh/g) | Example 6 Initial discharge capacity (mAh/g) |
| --- | --- | --- | --- | --- |
| 0.1 | 315 | 320 | 336 | 325 |
| 0.2 | 248 | 253 | 262 | 255 |
| 0.5 | 230 | 232 | 240 | 232 |
| 1 | 211 | 216 | 220 | 213 |
| 2 | 179 | 183 | 200 | 187 |
| 5 | 89 | 94 | 106 | 97 |

Referring to Table 3, the lithium batteries of Examples 7-8 are found to have improved discharge capacities and high-rate characteristics as compared with those of Comparative Examples 3-4.

As described above, according to the one or more of the above embodiments of the present invention, using the composite cathode active material having the novel structure may improve lifetime characteristics of a lithium battery.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A composite cathode active material for lithium secondary battery comprising:
   a core capable of intercalating and deintercalating lithium; and
   a crystalline coating layer disposed on at least part of a surface of the core, wherein the coating layer comprises a first lithium transition metal oxide and wherein the core comprises an over lithiated transition metal oxide having a layered structure, wherein the coating layer has a thickness of from about 1 Å to about 1 μm.

2. The composite cathode active material of claim 1, wherein the coating layer comprises $LiCoO_2$.

3. The composite cathode active material of claim 1, wherein the core comprises a compound represented by Formula 1 below:

$$pLi_2MO_3\text{-}(1\text{-}p)LiMeO_2 \quad \text{<Formula 1>}$$

wherein, in Formula 1, 0<p<1; M is at least one metal selected from the group consisting of magnesium (Mg), calcium (Ca), strontium (Sr), barium (Ba), titanium (Ti), zirconium (Zr), neodymium (Nb), molybdenum (Mo), tungsten (W), zinc (Zn), aluminum (Al), silicon (Si), nickel (Ni), chromium (Cr), iron (Fe), magnesium (Mg), strontium (Sr), vanadium (V), and a rare earth element, Me is at least one metal selected from the group consisting of titanium (Ti), vanadium (V), chromium (Cr), manganese (Mn), iron (Fe), nickel (Ni), copper (Cu), aluminum (Al), magnesium (Mg), zirconium (Zr), and boron (B).

4. The composite cathode active material of claim 1, wherein the core comprises a compound represented by Formula 2 below:

$$pLi_2MnO_3\text{-}(1\text{-}p)LiNi_aCo_bMn_cO_2 \quad \text{<Formula 2>}$$

wherein, in Formula 2, 0<p<1, 0<a<1, 0<b<1, 0<c<1, and a+b+c=1.

5. The composite cathode active material of claim 1, wherein the core comprises a compound represented by Formula 3 below:

$$xLi_2MO_3\text{-}yLiMeO_2\text{-}zLi_{1+d}M'_{2-d}O_4 \quad \text{<Formula 3>}$$

wherein, in Formula 3, x+y+z=1, 0<x<1, 0<y<1, and 0<z<1; 0≤d≤0.33;
M is at least one metal selected from the group consisting of magnesium (Mg), calcium (Ca), strontium (Sr), barium (Ba), titanium (Ti), zirconium (Zr), neodymium (Nb), molybdenum (Mo), tungsten (W), zinc (Zn), aluminum (Al), silicon (Si), nickel (Ni), manganese (Mn), chromium (Cr), iron (Fe), magnesium (Mg), strontium (Sr), vanadium (V), and a rare earth element;
Me is at least one metal selected from the group consisting of titanium (Ti), vanadium (V), chromium (Cr), manganese (Mn), iron (Fe), cobalt (Co), nickel (Ni), copper (Cu), aluminum (Al), magnesium (Mg), zirconium (Zr), and boron (B); and
M' is at least one metal selected from the group consisting of manganese (Mn), vanadium (V), chromium (Cr), iron (Fe), cobalt (Co), nickel (Ni), aluminum (Al), and boron (B).

6. The composite cathode active material of claim 1, wherein the core comprises a compound represented by Formula 4 below:

$$Li[Li_xMe_y]O_{2+d} \quad \text{<Formula 4>}$$

wherein, in Formula 4, x+y=1 and 0<x<1; 0≤d≤0.1; and
Me is at least one metal selected from the group consisting of manganese (Mn), vanadium (V), chromium (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt).

7. The composite cathode active material of claim 1, wherein the core comprises a compound represented by Formula 5 below:

$$Li[Li_xNi_aCo_bMn_c]O_{2+d} \quad \text{<Formula 5>}$$

wherein, in Formula 5, x+a+b+c=1; 0<x<1, 0<a<1, 0<b<1, 0<c<1; and 0≤d≤0.1.

8. The composite cathode active material of claim 1, wherein the core comprises at least one compound selected from the group consisting of Compounds represented by Formulae 6 to 10;

$$Li_xCo_{1-y}M_yO_{2-\alpha}X_\alpha \quad \text{<Formula 6>}$$

$$Li_xCo_{1-y-z}Ni_yM_zO_{2-\alpha}X_\alpha \quad \text{<Formula 7>}$$

$$Li_xMn_{2-y}M_yO_{4-\alpha}X_\alpha \quad \text{<Formula 8>}$$

$$Li_xCo_{2-y}M_yO_{4-\alpha}X_\alpha \quad \text{<Formula 9>}$$

$$Li_xMe_yM_zPO_{4-\alpha}X_\alpha \quad \text{<Formula 10>}$$

wherein, in Formulae 6 to 10, 0.90≤x≤1.1, 0≤y≤0.9, 0≤z≤0.5, and 1-y-z>0; 0≤α≤2;
Me is at least one metal selected from the group consisting of manganese (Mn), vanadium (V), chromium (Cr), iron (Fe), cobalt (Co), nickel (Ni), aluminum (Al), and boron (B);
M is at least one metal selected from the group consisting of magnesium (Mg), calcium (Ca), strontium (Sr), barium (Ba), titanium (Ti), zirconium (Zr), neodymium (Nb), molybdenum (Mo), tungsten (W), zinc (Zn), aluminum (Al), silicon (Si), nickel (Ni), manganese (Mn), chromium (Cr), iron (Fe), magnesium (Mg), strontium (Sr), vanadium (V), and a rare earth element; and
X is an element selected from the group consisting of oxygen (O), fluorine (F), sulfur (S), and phosphate (P).

9. The composite cathode active material of claim 1, wherein the core comprises a compound represented by Formula 11 below:

$$Li_xM_yM'_zPO_{4-d}X_d \quad \text{<Formula 11>}$$

wherein, in Formula 11, 0.9≤x≤1.1, 0<y≤1, 0≤z≤1, 1.9≤x+y+z≤2.1, and 0≤d≤0.2;
M is at least one selected from the group consisting of iron (Fe), manganese (Mn), nickel (Ni), and cobalt (Co);
M' is at least one selected from the group consisting of magnesium (Mg), calcium (Ca), copper (Cu), neodymium (Nd), strontium (Sr), barium (Ba), titanium (Ti), zirconium (Zr), niobium (Nb), molybdenum (Mo), tungsten (W), zinc (Zn), aluminum (Al), and silicon (Si); and
X is at least one selected from the group consisting of sulfur (S) and fluorine (F).

10. The composite cathode active material of claim 1, wherein the core comprises at least one selected from the group consisting of $LiFePO_4$, $LiFe_{1-a}Mn_aPO_4$ (0<a<1), and $LiMnPO_4$.

11. The composite cathode active material of claim 1, wherein the coating layer has a higher electrical conductivity than the core.

12. A cathode comprising the composite cathode active material of claim 1.

13. A lithium secondary battery comprising the cathode of claim 12.

14. The composite cathode active material of claim 1, wherein the coating layer has a high degree of crystallinity by producing the composite cathode active material by calcining both the coating layer and the core at a temperature of from about 800° C. to about 950° C. for about 5 hours to about 20 hours.

15. The composite cathode active material of claim 1, wherein the coating layer has a higher electrical conductivity than that of the core.

16. The composite cathode active material of claim 1, wherein the metal oxide of the coating layer may be from about 0.01 wt % to about 10 wt % based on a total weight of the composite cathode active material.

17. The composite cathode active material of claim 1, wherein the coating layer has a thickness of from about 10 to about 30 nm, the core having a diameter from about 10 nm to about 50 μm.

18. The composite cathode active material of claim 1, wherein a high crystallinity of the coating layer is achieved by producing the composite cathode active material by calcining both the coating layer and the core at a temperature of about 900° C. for about 10 hours.

19. The composite cathode active material of claim 2, the core being selected from a group consisting of $0.45(LiNi_{0.2}Co_{0.5}Mn_{0.3}O_2)\text{-}0.55(Li_2MnO_3)$, $0.5(LiNi_{0.2}Co_{0.5}Mn_{0.3}O_2)\text{-}0.5(Li_2MnO_3)$, $Li(Ni_{0.2}Co_{0.5}Mn_{0.3})O_2$ and $Li(Ni_{0.6}Co_{0.2}Mn_{0.2})O_2$.

* * * * *